United States Patent [19]

Yumiyama

[11] Patent Number: 4,879,486
[45] Date of Patent: Nov. 7, 1989

[54] PERMANENT-MAGNET GENERATOR USED FOR AN IGNITION DEVICE OF AN INTERNAL COMBUSTION ENGINE

[75] Inventor: Shigeru Yumiyama, Katsuta, Japan
[73] Assignee: Hitachi, Ltd., Tokyo, Japan
[21] Appl. No.: 141,146
[22] Filed: Jan. 6, 1988
[30] Foreign Application Priority Data Jan. 21, 1987 [JP] Japan ..................................... 62-9872

[51] Int. Cl.[4] .......................... F02P 1/02; H02K 37/12
[52] U.S. Cl. ................................... 310/254; 123/599; 310/153; 310/208
[58] Field of Search .......... 123/149 A, 149 R, 149 D, 123/599, 600, 601; 310/70 A, 70 R, 74, 112, 153, 254, 269

[56] References Cited

U.S. PATENT DOCUMENTS

| 3,893,439 | 8/1975 | Chudoba | 123/149 R |
| 4,259,938 | 4/1981 | Johansson | 310/70 A |
| 4,418,677 | 12/1983 | Hofmann | 123/599 |
| 4,591,746 | 5/1986 | Kamiyama | 310/70 A |
| 4,779,454 | 10/1988 | Fitzner et al. | 310/153 |

Primary Examiner—Patrick R. Salce
Assistant Examiner—D. L. Rebsch
Attorney, Agent, or Firm—Antonelli, Terry & Wands

[57] ABSTRACT

A rotor is fitted on a rotational driving shaft of an internal combustion engine. Permanent magnets are arranged on the circumference of the rotor. Opposing the permanent magnets, a number of coils for charging a battery used for lighting, and a group of coils for charging a condenser used for ignition, are arranged on the stator core radially. The group of coils for charging the condenser are arranged on a number of salient poles extending along the axial direction of the stator. The coils for charging the ignition condenser generate two separate voltages at low and high rotational speeds of the engine.

1 Claim, 3 Drawing Sheets

PERMANENT-MAGNET GENERATOR USED FOR AN IGNITION DEVICE OF AN INTERNAL COMBUSTION ENGINE

FIELD OF THE INVENTION

This invention relates to a permanent-magnet generator used for an ignition device of an internal combustion engine. More particularly, this invention relates to a permanent-magnet generator used for an ignition device of an internal combustion engine which is equipped with suitable coils for charging a condenser used for ignition to increase a generating performance.

BACKGROUND OF THE INVENTION

In, for example, FIG. 1 of Japanese Utility Model Publication No. 60-11743 (1985) published on Apr. 17, 1985 entitled "Permanent-magnet generator used for an ignition device of an internal combustion engine", two coils for charging a condenser used for ignition are arranged on two salient poles among a number of salient poles of an outer periphery of a stator core, and a number of coils for charging a battery used for lighting are arranged on the remaining salient poles.

However, the prior permanent-magnet generator in this field is not considered with respect to the numbers of the coils for charging the condenser used for ignition along the peripheral direction of the generator, so that the prior permanent-magnet generator has such a drawback that the magnetic type generator becomes large in size when the output of the lighting is demanded to increase.

SUMMARY OF THE INVENTION

An object of the present invention is to provide a permanent-magnet generator used for an ignition device of an internal combustion engine which is able to increase the charge performance of lighting without enlarging the size of the magnet type generator while at the same time allowing the charging and discharging of the condenser used for ignition to occur always at the same time for both low speed and high speed of engine operation.

The object of the present invention is accomplished by arranging a plurality of coils for charging the condenser used for ignition at stepped positions along the axial direction of the generator. Thus all of the salient pole would coils may be used for charging the battery used for lighting except for the coils at one salient pole position where two coils are located for charging a condenser used for ignition. Accordingly, since the number of the coils for charging the battery used for lighting can be increased without enlarging the magnetic type generator, the charge performance of the lighting thereof can be increased.

BRIEF DESCRIPTION OF THE DRAWINGS

FIG. 5 shows a sectional view along A—A line shown in FIG. 4 to illustrate that coil 3b is axially behind coil 3a.

DETAILED DESCRIPTION OF THE PREFERRED EMBODIMENTS

Figure 1:
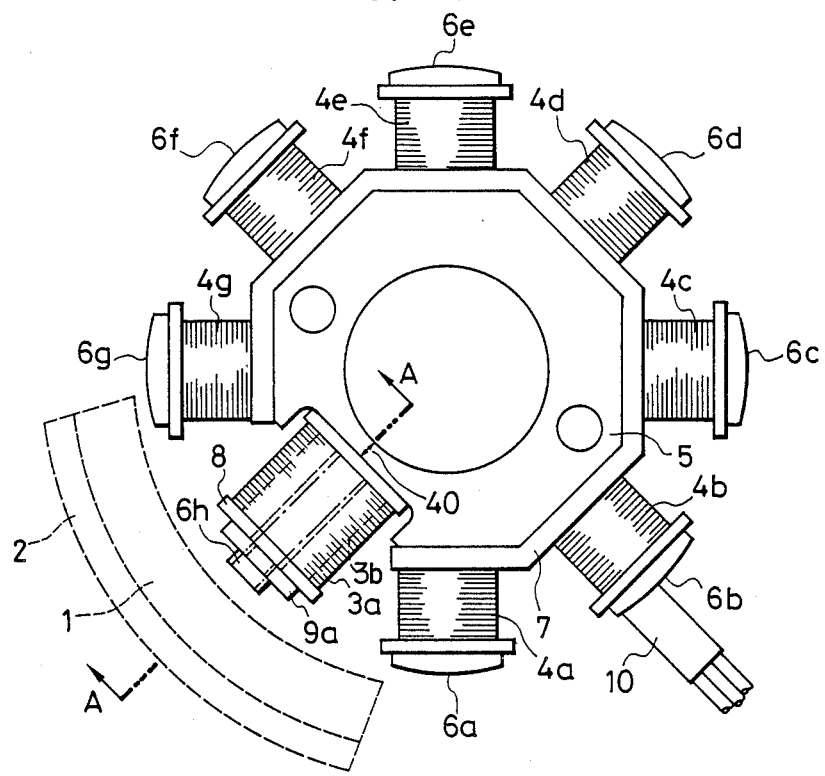
FIG. 1 shows a front view of a stator of one embodiment of the present invention.
Figure 2:
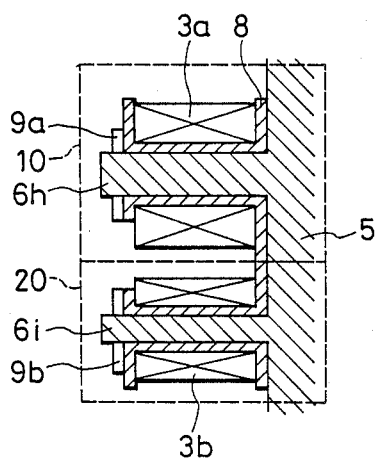
FIG. 2 shows a sectional view along A—A line shown in FIG. 1 showing two coils 3a and 3b that are in axial alignment at the same radial position.

Referring to FIGS. 1, and 2, the permanent-magnet generator used for the ignition device of an internal combustion engine comprises a rotor 2 which carries a permanent magnet 1 within the inner periphery thereof, and a stator 5 having the coil 3a for charging the condenser used for ignition in a low speed of the engine, a smaller sized coil 3b which is axially behind coil 3a as shown by the chain line for charging the condenser used for ignition in a high speed of the engine, and coils 4 for charging the battery used for lighting. The coils 4 used for lighting are wound on seven alignment poles 6a–6g among a number of salient poles 6 arranged radially along the outer periphery of the stator core 5 insulating electrically the salient poles 6a–6g of the stator core by frames 7 made from an insulator.

After the coils 3a and 3b used for the ignition are wound within a bobbin 8 formed in unitary body by resin, the coils 3a and 3b are inserted to salient poles 6h and 6i as shown in FIG. 2. Coils 3a and 3b are divided into two steps extending along the axial direction of the stator. Coils 3a and 3b are held together with the bobbin 8, and fixed by U shaped thin plate fixing members 9a and 9b to the salient poles 6h and 6i, respectively. The output of each coil 3a and 3b, 4a–4g is supplied from the generator through lead wires 10.

As apparent from FIG. 1, the salient poles 6h and 6i for coils 3a and 3b used for ignition are longer in the radial direction relative to the rotational axis of the rotor 2 when the corresponding lengths of the compared with other salient poles 6a–6g. Accordingly, the thickness 40 in the radial direction of the stator core 5 in this portion is thin, so that the magnetic reluctance therein is comparatively high.

The prior permanent-magnet generator necessitates a wide space on the stator core for arranging two independent salient pole would coils for charging the condenser used for ignition which output separate voltages, one at low and the other at high speeds of the engine. The permanent-magnet generator of the embodiment of the present invention can arrange the two salient poles 6h and 6i in a narrow space equivalent to the space required for one salient pole of the prior art, since one of the salient pole radial positions has two pole windings, one positioned behind the other as viewed in FIG. 1, to be axially displaced along the axial direction of the generator, and the two coils 3a, and 3b are wound thereon, so that the charge performance of lighting of the present invention can be increased without enlarging the physical size of the generator.

Figure 3:
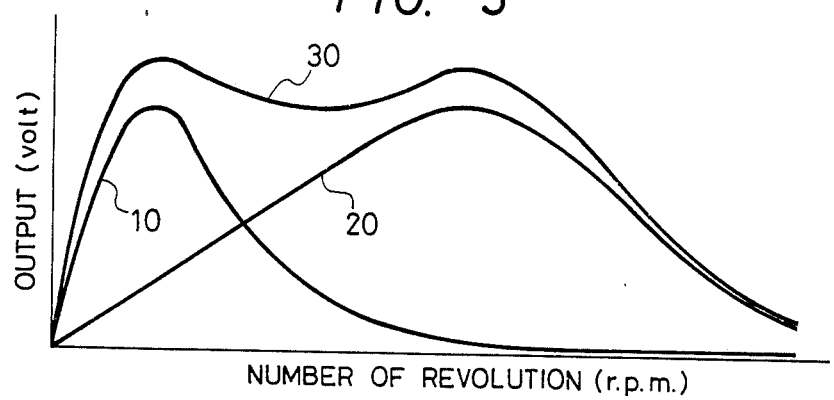
FIG. 3 shows output characteristic diagrams of the coils for charging the condenser used for ignition corresponding to the rotational speed of a permanent-magnet generator of the present invention.

Referring to FIG. 3, 10 denotes the characteristic curve which is obtained by the coil 3a used at low speed of the engine. 20 denotes the characterisic curve which is obtained by the smaller coil 3b used at high speed of the engine. By connecting the lead wires of the coils 3a and 3b, an output shown by curve 30 can be obtained.

According to the embodiment of the present invention explained above, since the coils 3a and 3b for charging the condenser in the low and high rotational speeds of the engine are arranged in same position with respect to the radial direction of the stator core 5, the charge and discharge of the condenser connected to the coils 3a and 3b are always carried out at the same time, so that the most preferable ignition timing can be easily set from the low rotational speed to the high rotational speed of the engine. Since the two coils for charging the condenser used for ignition are inserted on the salient poles 6h and 6i are divided or separated into two steps after the coils are wound within bobbin 8 formed by the unitary member mode of a synthetic resin, the inserting process of the coils 3a and 3b is carried out at one time so that the efficiency of assembling the coils can be increased.

According to the formation of the stator core 5 explained above, since the axial length of the salient poles 6h and 6i is greater than the axial length of the other salient poles 6a–6g, the number of windings on the coil 3b used for the low rotational speed of the engine can be increased sufficiently so that it is not necessary to increase the size of the salient poles 6h and 6i along the axial direction of the stator core 5. Although the magnetic reluctance of the portion 40 of the salient poles 6h and 6i is comparatively increased by adopting the construction explained above, and the current generated at the coils 3a and 3b for charging the condenser used for ignition is small compared with that generated at the coils 4a–4g for charging the battery used for lighting. According to the structure of 10, and 20 shown by the dotted lines in FIG. 2, it accomplishes the effect that a generation of a noise signal generated at the portions 10 and 20 can be prevented, since the magnetic flux introduced thereto through the portion 40 from other salient poles 4a–4g is small.

Figure 4:
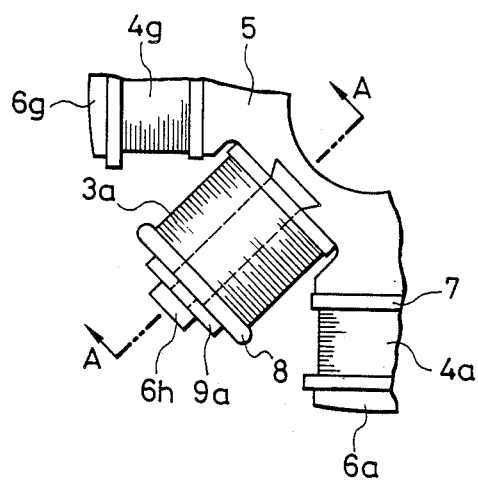
FIG. 4 shows a front view of a stator of another embodiment of the present invention.
Figure 5:
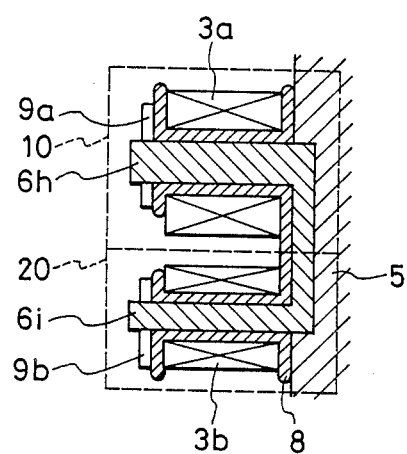

Referring to FIGS. 4 and 5 showing another embodiment of the present invention, after the bobbin 8 formed in an unitary body by the resin is inserted to the salient poles 6h and 6i, and the coils 3a and 3b for charging the condenser used for ignition are wound on the bobbin 8, the salient poles 6h and 6i are mounted on the stator core 5 by welding or wedging. According to the second embodiment of the present invention explained above, the permanent-magnet generator of the embodiment can accomplish the effect of the first embodiment of the present invention explained in connection with FIGS. 1 and 2. At the same time the generator shown in FIGS. 4 and 5 can accomplish the effect that the coils 3a and 3b for charging the condenser used for ignition are not subjected to excessive force when the coils 3a and 3b are assembled to the stator core 5.

Figure 6A:
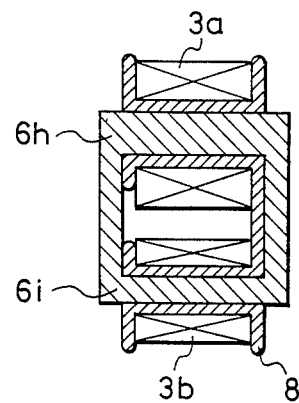
FIG. 6A, FIG. 6B and FIG. 6C show modifications the salient poles shown in FIG. 5.

Referring to FIG. 6A, the salient poles 6h and 6i are formed by an unitary body having four planar wall portions. The salient poles 6h and 6i are arranged relative to the stator core 5 as shown in FIGS. 4 and 5.

Figure 6B:
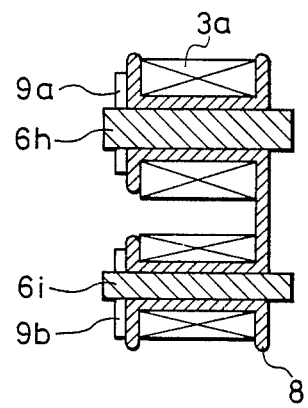

Referring to FIG. 6B, and pair of salient poles 6h and 6i are arranged to the stator core 5 in same manner as shown in FIGS. 4 and 5.

Figure 6C:
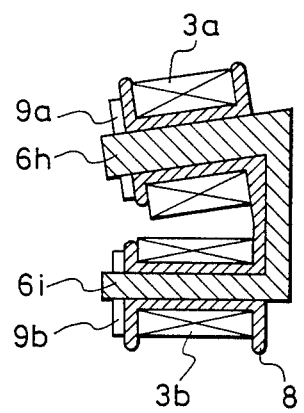

Referring to FIG. 6C, although the wall portions of the salient poles 6h and 6i are not parallel, the poles 6h and 6i can be arranged on the stator core 5 as an alternative to the arrangement shown in FIGS. 6A and 6B.

According to the present invention, the number of coils for charging the battery used for lighting can be increased without enlarging the size of the generator while at the same time the charge performance of lighting of the permanent-magnet generator used for the ignition device of the internal combustion engine can be improved.

What we claim is:

1. A permanent-magnet generator used for an ignition device of an internal combustion engine comprising:
   a rotor fitted on a rotational driving shaft of the internal combustion engine and mounted for rotation about an axis;
   permanent magnets on a circumference of the rotor;
   a stator core having a plurality of salient poles facing toward the permanent magnets of the rotor each with a coil positioned around the outer periphery of each salient pole; and
   a plurality of salient pole wound coils for charging a condenser used for ignition arranged in steps along an axial direction of said stator core;
   wherein axial lengths along a radial direction with respect to the rotational axis of said plurality of salient pole wound coils are longer than the corresponding lengths of the other salient pole wound coils on said stator core.

* * * * *